(12) United States Patent　　(10) Patent No.:　US 12,630,150 B2

Roeber et al.　　(45) Date of Patent:　May 19, 2026

(54) ILLUMINATION METHOD AND ILLUMINATION SYSTEM FOR A REMOTE-CONTROLLED PARKING MANEUVER

(71) Applicant: FORD GLOBAL TECHNOLOGIES, LLC, Dearborn, MI (US)

(72) Inventors: Marc Roeber, Düsseldorf (DE); Florian Vieten, Meerbusch (DE); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 19/200,997

(22) Filed: May 7, 2025

(65) Prior Publication Data

US 2025/0346179 A1　　Nov. 13, 2025

(51) Int. Cl.
　B60W 30/06　　(2006.01)
　B60Q 1/00　　(2006.01)
　B60Q 1/48　　(2006.01)

(52) U.S. Cl.
　CPC ........... B60W 30/06 (2013.01); B60Q 1/0023 (2013.01); B60Q 1/48 (2013.01); *B60Q 2300/314* (2013.01); *B60Q 2300/45* (2013.01); *B60Q 2400/50* (2013.01)

(58) Field of Classification Search
　CPC .... B60Q 1/48; B60Q 1/085; B60Q 2300/314; B60Q 2300/45; B60Q 2400/50; B60W 30/60
　See application file for complete search history.

(56) References Cited

U.S. PATENT DOCUMENTS

| | | | |
|---|---|---|---|
| 10,246,000 B2 | 4/2019 | Schneider et al. | |
| 10,730,511 B2 | 8/2020 | Breuel et al. | |
| 2006/0287826 A1* | 12/2006 | Shimizu | G01C 21/3602 |
| | | | 701/431 |
| 2018/0364697 A1* | 12/2018 | Elangovan | G05D 1/0016 |
| 2019/0204825 A1* | 7/2019 | Golgiri | H04W 4/021 |
| 2025/0282283 A1* | 9/2025 | Böckenhoff | B60Q 1/48 |

FOREIGN PATENT DOCUMENTS

| | | |
|---|---|---|
| DE | 102014011811 A1 | 2/2016 |
| DE | 102015012808 A1 | 4/2017 |
| DE | 102016215245 A1 | 2/2018 |
| DE | 102016116705 A1 | 3/2018 |

* cited by examiner

*Primary Examiner* — Robert J May

(74) *Attorney, Agent, or Firm* — Frank L. Lollo; MacMillan, Sobanski & Todd, LLC

(57)　　ABSTRACT

A remote-controlled vehicle parking system provides illumination in the area of a user during a parking maneuver. After initiation of a remote-controlled parking maneuver by the user, an illumination device is activated for bringing about at least one of the following illumination processes during a remote-controlled parking maneuver at night or in low-light situations: (i) the illumination of the ground surface around the user; (ii) the illumination of the user themselves; and (iii) the projection of a warning symbol onto the ground surface to draw attention to the user.

20 Claims, 3 Drawing Sheets

ILLUMINATION METHOD AND ILLUMINATION SYSTEM FOR A REMOTE-CONTROLLED PARKING MANEUVER

CROSS REFERENCE TO RELATED APPLICATIONS

This application claims priority to application DE102024113295.7, filed in the German Patent and Trademark Office on May 13, 2024, which is incorporated herein by reference in its entirety.

STATEMENT REGARDING FEDERALLY SPONSORED RESEARCH

Not Applicable.

BACKGROUND OF THE INVENTION

The present invention relates to an illumination method and to an illumination system for bringing about an illumination process during a remote-controlled parking maneuver.

In the modern automotive industry, the development of driving assistance systems, in particular the development of remote-controllable parking assistance systems, so-called RePA systems (RePA: Remote Park Assist), has changed the way in which vehicles are parked. These advanced systems make it possible for the driver to park the vehicle remotely, without being physically present in the vehicle. This offers considerable convenience, in particular in narrow parking spaces or in situations in which entering and exiting the vehicle could be difficult. The current prior art comprises various sensors and cameras which interact to maneuver the vehicle safely into a parking space, while the driver observes the vehicle from outside.

Despite the impressive advances in driving assistance systems technology, there is still potential for improvement, in particular in relation to the use of these systems at night or in low-light environments.

In German patent publication DE102015012808A1, a method for operating an arrangement having at least one illumination device for a motor vehicle is disclosed, wherein a capturing device captures at least one item of object information regarding an object in the environment of the motor vehicle and a control device produces at least one control signal from the at least one item of object information and the at least one illumination device of the motor vehicle is controlled as a function of the at least one control signal.

A vehicle having an illumination system for informing a road user about a planned movement of the vehicle by imaging a light pattern onto a navigable area is known from German patent publication DE102014011811A1. Moreover, DE102014011811A1 describes a vehicle having a detector system for detecting an autopilot-controlled operating mode and/or a planned route of another vehicle, the illumination system of which images a light pattern onto a navigable area. The detector system typically has a camera. Furthermore, DE102014011811A1 describes a method for informing a road user about a planned movement of a first vehicle.

Finally, German patent publication DE102016215245A1 discloses a method for carrying out an automatic or semi-automatic parking procedure of a motor vehicle, wherein there is a communication link between an operator located outside the motor vehicle and the motor vehicle. The parking procedure is monitored by the operator, and the motor vehicle has at least one surroundings sensor system for capturing objects, wherein objects in the immediate surroundings of the motor vehicle, which lie in the area of a planned trajectory, are captured. A control unit selects at least one illumination device depending on the captured objects and activates it such that the object is spotlit by the selected illumination device, wherein, if none of the illumination devices can spotlight the object, at least a plurality of illumination devices are activated simultaneously, alternatingly and/or in a pulsing manner.

SUMMARY OF THE INVENTION

Improving upon this prior art, the invention is based on the object of making available an advantageous illumination method and an advantageous illumination system.

This object is achieved by an illumination method for bringing about an illumination process during a remote-controlled parking maneuver for a vehicle, and by an illumination system for bringing about an illumination process during a remote-controlled parking maneuver for a vehicle.

The embodiments described below and in particular any "preferred" embodiments are possible examples of implementations and are presented merely for a better understanding of the principles of the invention. Many variations and modifications can be performed on the embodiment(s) described above without deviating significantly from the spirit and principles of the techniques described here. All modifications are intended to be included here within the scope of this disclosure and protected by the appended claims.

An embodiment of the invention makes available an illumination method for bringing about an illumination process during a remote-controlled parking maneuver for a vehicle. This illumination method comprises the steps: detection of the initiation of a remote-controlled parking maneuver by a user and activation of an illumination device for bringing about at least one of the following illumination processes during a remote-controlled parking maneuver at night or in low-light situations when the initiation of a remote-controlled parking maneuver for the vehicle is detected: (i) illumination of the ground surface around the user, (ii) illumination of the user themself, (iii) projection of a warning symbol to draw attention to the user. The projection of the warning symbol can take place in particular in the direction of detected and/or potentially appearing road users.

An advantage of this embodiment is the increase in safety for the user and/or the visibility of the user in dark or poorly illuminated environments during the remote-controlled parking maneuver. By automatically illuminating the ground surface around the user, as soon as the remote-controlled parking maneuver is initiated, potential trip hazards or other hazards in the surroundings of the user can be effectively illuminated and therefore avoided. Illuminating the user themself contributes to the safety of the user and to general traffic safety, by improving the visibility of the user for other road users. By projecting a warning symbol directly onto the road, for example, important information and warnings can be communicated effectively to drivers/riders such as car drivers, cyclists, motorcyclists etc. and pedestrians. This can significantly improve traffic safety by indicating the user of the remote-controllable parking assistance system, for example, as a possible hazard point or giving special instructions for traffic routing.

In an embodiment of the invention, an illumination device worn by the user is used as an illumination device. The illumination device can be a vest, a belt or a jacket, for example, with integrated LEDs for illuminating the user. In particular, any type of clothing can be fitted with LEDs for illumination. This embodiment offers the advantage of a mobile and personal illumination solution which functions regardless of the position of the vehicle. A wearable illumination device such as this not only increases the visibility and safety of the user during a remote-controlled parking maneuver, by making them clearly visible in dark environments, but also enables flexible adaptation to various situations and requirements of the user. In addition, the wearable illumination can be designed as a fashionable accessory item which is both functional and aesthetically appealing, and thus increases user acceptance and willingness of the users to use it.

In a further embodiment of the invention, an illumination device integrated into a mobile device is used as an illumination device, for example an LED flash of a camera or the LED light of a smartphone, which functions as a flashlight or a torch. This embodiment uses existing devices such as smartphones or cameras in order to provide an additional illumination source. Since many people always carry a smartphone with them, for example, such illumination sources are frequently available. In addition, LED lamps can be very bright and consume relatively little energy, which makes them ideal for mobile use.

In a further embodiment, at least one illumination device of the vehicle is used as an illumination device, for example the headlights or a peripheral illumination device of the vehicle. In this way, carrying out the method is also possible if there is no illumination device for the user to wear and the user also does not have a mobile device with them. This embodiment can also comprise the steps of:

locating the user by means of an external sensor system of a vehicle;

monitoring the movement of the user by means of the external sensor system of the vehicle; and directing the at least one illumination device of the vehicle onto the ground surface around the user and/or onto the user themself and/or projecting a warning symbol onto a point dependent on the position of the user.

In particular, at least one camera can be used as an external sensor system. Using a camera as an external sensor system offers the advantage of precise and versatile capturing of the environment. Cameras can be used not only to capture movements, but also to detect gestures and even specific features of the user, which enables personalized interaction with the vehicle. Moreover, image processing technology can be used to analyze the environment of the vehicle in a detailed manner, which further improves the accuracy of user detection and monitoring.

According to a further embodiment of the invention, the illumination device is activated by the parking assistance system as soon as the latter is started and the latter detects night or a low-light situation. Night or a low-light situation can be detected using the external sensor system of the vehicle, for example. The illumination device can be activated automatically depending on the external illumination situation, which unburdens the user since they do not have to take care of the activation manually, and at the same time improves the safety of the user since they cannot forget to switch on the illumination.

In a further embodiment of the present invention, the illumination method comprises projecting a warning symbol onto the road surface around or beside the user, for example. By projecting symbols directly onto the road, important information and warnings can be communicated effectively to drivers/riders such as car drivers, cyclists, motorcyclists, etc. and pedestrians. This can significantly improve traffic safety by indicating the user of the remote-controllable parking assistance system, for example, as a possible hazard point or giving special instructions for traffic routing.

In a further embodiment of the invention, the user is illuminated except for the head, in particular if the illumination takes place from the vehicle. This selective illumination can be used to increase the visibility of the user in the dark without impairing the view of the user themself or dazzling other road users. By leaving out the head area, dazzling effects by the illumination are avoided, which is particularly important so as not to disturb the night vision of the user.

According to a further embodiment of the invention, the illumination method additionally comprises illuminating fellow travelers, accompanying pets or articles laid down by the user. An advantage of this embodiment is that the safety not only of the user of the remote-controllable parking assistance system but also of all those involved is increased, by making all potential hazards or obstacles visible.

In a further embodiment of the invention, in particular a smartphone of the user is used to illuminate the road surface around the user. The advantage here is practicability since many people always carry their smartphone with them. This enables a spontaneous and flexible reaction to the need for illumination, without requiring additional devices.

According to a further embodiment of the invention, the illumination is maintained during the entire remote-controlled parking maneuver. This increases the safety and enhances the orientation of the user during the entire remote-controlled parking maneuver. It minimizes the risk of accidents or errors which could be caused by sudden darkness, for example due to the failure of streetlights.

In a further embodiment of the invention, the illumination is maintained after completion and/or cancellation of the remote-controlled parking maneuver, until at least one of the following conditions is met:

the user has reached a safe area;

the user has entered the vehicle;

the user has exceeded a predetermined distance from the vehicle; and the user can no longer be located.

An advantage here is the continuous safety of the user, even after the actual remote-controlled parking maneuver has been completed or cancelled. This ensures that the user is able to reach a safe area without being endangered by darkness.

According to a further embodiment of the invention, an illumination system for bringing about an illumination process during a remote-controlled parking maneuver for a vehicle by means of an illumination device is made available. The illumination system comprises a controller which is designed to detect the initiation of a remote-controlled parking maneuver for the vehicle and, if the initiation of a remote-controlled parking maneuver for the vehicle is detected, to activate the illumination device in order to bring about at least one of the following illumination processes during a remote-controlled parking maneuver at night or in low-light situations:

(i) illumination of the ground around the user, (ii) illumination of the user themself, and (iii) projection of a warning symbol to draw attention to the user.

In one embodiment, the illumination device comprises an illumination device of the vehicle, in a further embodiment of the invention, the illumination device comprises an illumination device of a mobile device such as an LED camera flash or the LED light of a smartphone, which functions as a flashlight or a torch, and in yet a further embodiment the illumination device comprises an illumination device worn on the body of the user, which can be a vest, a belt, a jacket or another item of clothing, for example, with integrated LEDs.

According to a further embodiment of the invention, a mobile device is made available which comprises a processor, a communication module and an illumination device. The communication module is configured to receive an illumination instruction from the illumination system of the vehicle. The processor is configured to process the received illumination instruction and, on the basis thereof, to perform illumination by means of the illumination device.

The processor and the communication module can be integrated into a single integrated circuit. The main advantage of this embodiment lies in miniaturization and an increase in efficiency. As a result of integration in a single chip, the size of the device is reduced and energy consumption is lowered, which is particularly important for mobile devices. This compactness and efficiency can improve performance and at the same time reduce the space requirement and costs for additional components.

The communication module can, for example, be selected from the following group: WLAN module, Bluetooth module, ultra-wideband module (UWB), LTE module, 5G module, and NFC module, but other (future) technologies can also be used. The advantage of this embodiment lies in the flexibility and variety of communication options. Smartphones typically have a plurality of these communication modules. Depending on the application scenario, therefore, the most well suited communication module can be selected, in order to guarantee optimum connection quality, range, energy consumption and data transfer speed. For example, NFC enables simple and secure short-distance coupling, while 5G can be used for fast data transfer over greater distances. This multitude of communication modules allows the device to function effectively in various environments and for different applications.

In a further embodiment of the mobile device, it is configured to provide a user interface by means of which a user can input instructions and/or obtain information regarding the vehicle status. As a result, the user can interact directly with the parking assistance system in order to operate it remotely. This embodiment also makes a partially autonomous parking procedure possible, in which the user transmits control instructions to the vehicle during the parking procedure.

In a further embodiment of the invention, a vehicle is made available which comprises an illumination system, according to the invention, for illuminating a user of a remote-controllable parking assistance system.

Embodiments of the invention are defined by the appended claims and not by this short summary. A more extensive overview of different aspects of the invention is provided here purely to present a selection of designs which are further described below in the section giving a more comprehensive description. This short summary is not intended to identify any key or essential features of the claimed subject matter and is also not intended to be used as an isolated aid for determining the scope of protection of the claimed subject matter.

While the invention can be implemented in various forms, some exemplary and non-limiting embodiments are depicted in the figures and are described below. The present disclosure is to be considered as an exemplary depiction of the invention and is not used to limit the invention to the depicted specific embodiments.

BRIEF DESCRIPTION OF THE DRAWINGS

Further features and advantages of the invention can be gathered from the following description of exemplary embodiments with reference to the drawings, wherein.

DETAILED DESCRIPTION OF PREFERRED EMBODIMENTS

Figures 1, 2, 3:
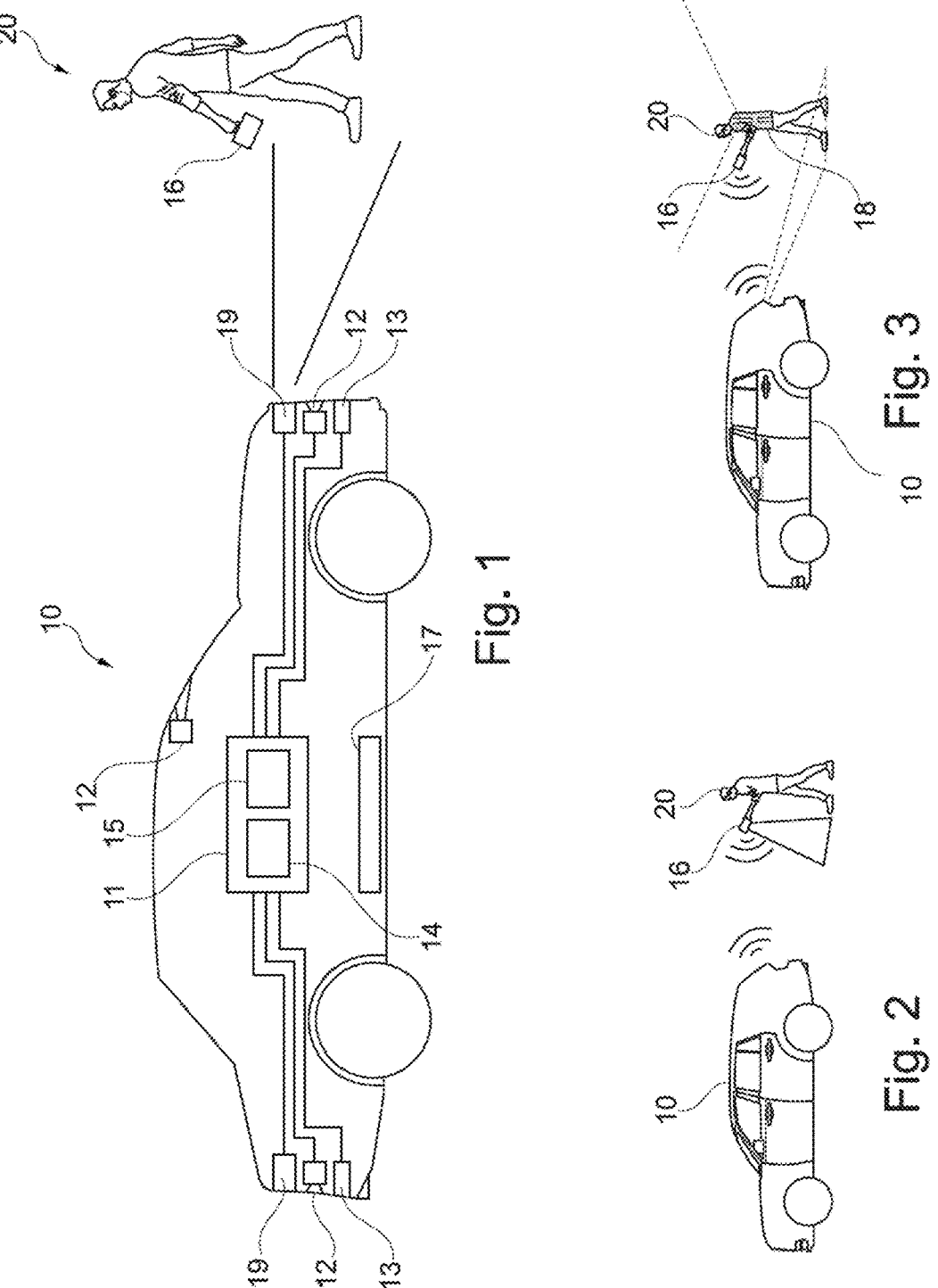
FIG. 1 shows a vehicle with a remote-controllable parking assistance system.
FIG. 2 shows a schematic depiction of the illumination of a user of a remote-controllable parking assistance system using the flashlight of the mobile device.
FIG. 3 shows a schematic depiction of the illumination of a user of a remote-controllable parking assistance system using an illumination device worn on the body of the user.

There is described hereinafter, with reference to FIGS. 1 to 3, a vehicle 10 with an illumination system 11 which is set up to execute an illumination method for illuminating a user 20 of a remote-controllable parking assistance system (RePA, Remote Park Assistant). In the present exemplary embodiment, the illumination system 11 is integrated into the remote-controllable parking assistance system. It is connected to sensor components 12, 13, present in the vehicle 10, for detecting the environment of the vehicle 10, which also comprises a control unit 14. Moreover, in the present example, the illumination system 11 comprises a communication unit 15 by means of which it can communicate with a smartphone 16 of the user 20, an illumination device worn on the body of the user 20 of the vehicle such as a vest 18 (FIG. 3) fitted with LEDs, a belt fitted with LEDs, an item of clothing fitted with LEDs, etc.

In the present example, the components 12, 13 for detecting the environment of the vehicle 10 comprise one or more sensors, such as at least one ultrasonic sensor, at least one radar unit, at least one LiDAR unit, etc., and at least one camera. The means for detecting the environment of the vehicle 10 are used to locate the user 20 of the remote-controllable parking assistance system and to monitor the movement of the user 20 preferably in the entire 360° surroundings of the vehicle 10 over a range of a plurality of meters, in particular of at least 10 meters, preferably of at least 20 meters. In the present exemplary embodiment, the means for detecting the environment of the vehicle 10 are also used to capture, for the remote-controllable parking assistance system, the availability and location of parking spaces relative to the vehicle 10.

For example, the LED light of the smartphone 16 can be activated by means of the communication unit 15, in order thus to illuminate the ground surface in front of the user 20 or around the user 20, as is depicted schematically in the example shown in FIG. 2. During the parking maneuver, the LED is generally directed downward since the user would be using the touchscreen display of the smartphone at this time.

Since the vehicle 10 communicates with the smartphone 16 for the parking maneuver anyway, the illumination system 11 integrated into the remote-controllable parking assistance system can activate the LED of the smartphone as soon as the user starts the remote-controllable parking assistance system in low-light situations, for example at night. The LED can either light continuously or blink slowly, for example, in order to increase attention. Furthermore, the illumination system of the vehicle 10 can also blink slowly. In addition, there is the possibility for the LED of the smartphone or the illumination system of the vehicle 10 to blink only when approaching vehicles or pedestrians are detected by the external sensor system of the vehicle 10.

In FIG. 3, an example is shown in which a vest 18, of the user 20, containing LEDs is activated by means of the communication unit 15, so that the user 20 is clearly visible for other road users. Moreover, in the present exemplary embodiment, the illumination system 11 controls the vehicle headlights 19, in order to illuminate the ground surface around the user 20. Instead of the vehicle headlights 19 or in addition to the vehicle headlights 19, lights of a peripheral illumination 17 of the vehicle 10 can also be used.

Figure 4:
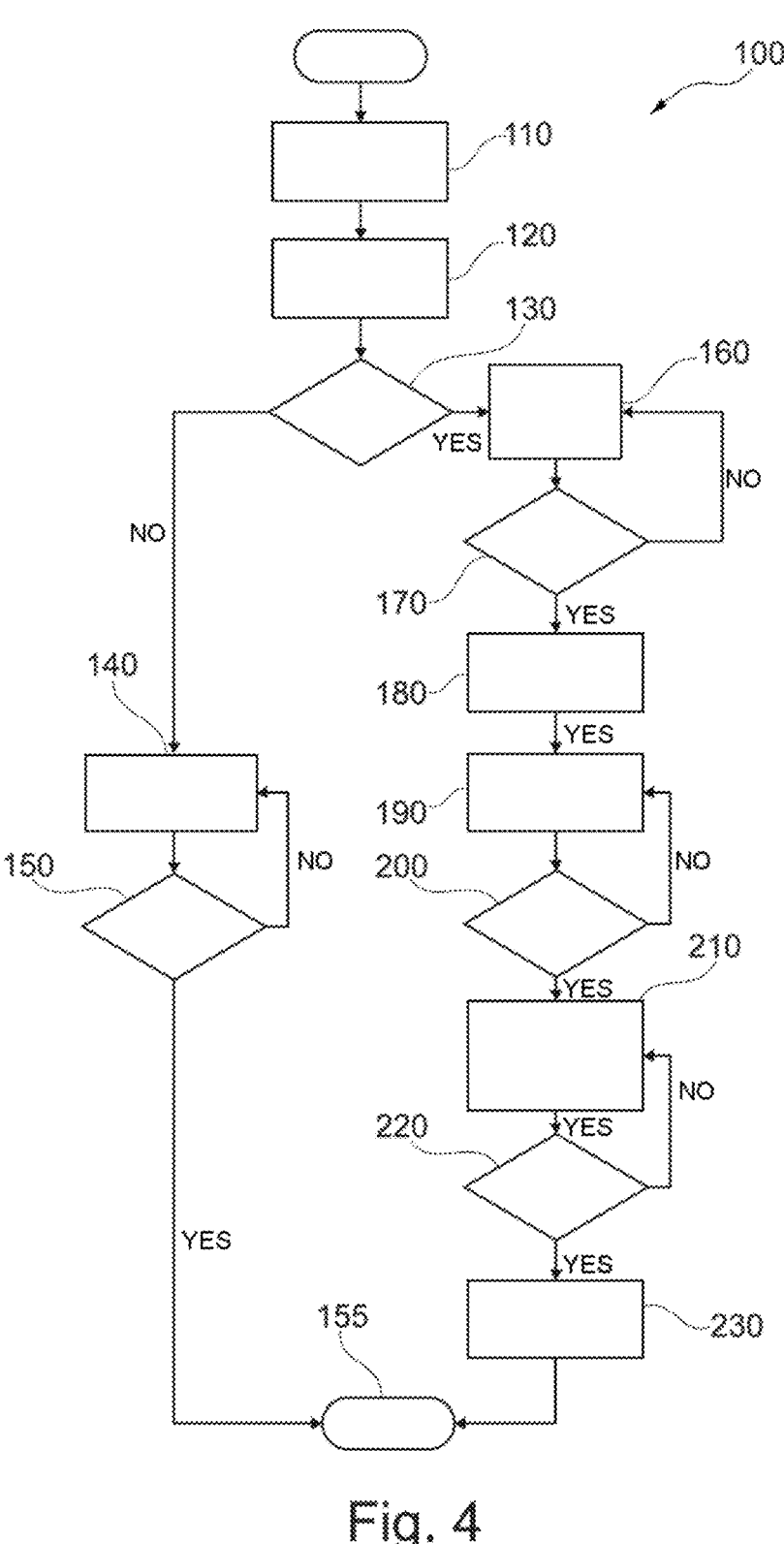
FIG. 4 shows a flowchart of an embodiment of an illumination method for illuminating a user of a remote-controllable parking assistance system using the illumination system according to the invention.

FIG. 4 shows a flowchart which depicts a multiplicity of steps of an embodiment of the illumination method according to the invention, which in the present exemplary embodiment is part of a remote-controllable parking maneuver executed by a remote-controllable parking assistance system.

The implementation of the remote-controllable parking assistance system 100 for carrying out a parking maneuver begins in step 110 with the activation of the remote-controllable parking assistance system by the user 20. After the activation of the remote-controllable parking assistance system, initially the ambient light conditions are ascertained in step 120. In step 130, it is verified whether the ambient brightness is below a stipulated threshold value. This verification is essential, since the visibility and detection of obstacles can depend heavily on the light conditions. A sufficient degree of ambient brightness is advantageous for the safety of the user 20 during the remote-controlled parking maneuver. If it is established in step 130 that the ambient brightness is above the stipulated threshold value, the parking maneuver is executed directly in step 140. Then in step 150 it is verified whether the parking maneuver has been completed or canceled. If the maneuver has not been completed or canceled, the method returns to step 130 and continues the parking maneuver, or carries it out again if it has been canceled. In the present exemplary embodiment, the remote-controllable parking assistance system verifies continuously whether the parking maneuver has been completed or canceled. If this is not the case, the parking maneuver is continued or repeated with the aim of bringing about successful parking of the vehicle 10. A maximum number of cancellations is preferably prescribed, after which the parking maneuver is permanently canceled and a signal is given to indicate that the parking maneuver is not possible. If the maneuver has been completed or permanently canceled, the implementation of the remote-controllable parking assistance system is terminated in step 155.

If the ambient brightness is below the stipulated threshold value, the user 20 of the remote-controllable parking assistance system is located in step 160. In step 170, it is verified whether the user 20 has been located outside the vehicle 10. If the user 20 is not located outside the vehicle 10, the locating step 160 is repeated until one of the following conditions is met: (i) The implementation of the remote-controllable parking assistance system is completed, (ii) the user 20 is located outside the vehicle 10, (iii) the ambient brightness rises above the stipulated threshold value.

If the user 20 has been located outside the vehicle 10, in step 180 the ground around them is illuminated and/or they themself are illuminated. In addition, their movement is tracked so that the illumination can follow the movement if necessary. Then in step 190 the parking maneuver is carried out.

Then, in step 200, it is verified whether the parking maneuver has been completed or canceled. If the maneuver has not been completed or canceled, the method returns to step 190 and continues the parking maneuver or carries it out again if it has been canceled. In the present exemplary embodiment, the remote-controllable parking assistance system verifies continuously whether the parking maneuver has been completed or canceled. If this is not the case, the maneuver is continued or repeated with the aim of bringing about successful parking of the vehicle 10. A maximum number of cancellations is preferably prescribed, after which the parking maneuver is permanently canceled and a signal is given to indicate that the parking maneuver is not possible. If the maneuver has been completed or canceled, the illumination of the user 20 is continued in step 210, and their movement is further tracked.

In the next step 220, it is verified whether the user 20 has left the relevant illumination area. The method assumes that the user 20 has left the relevant illumination area if one of the following conditions is met:

the user 20 has entered the vehicle 10;

the user 20 has exceeded a predetermined distance from the vehicle 10; and the user 20 can no longer be located.

If the user 20 has not left the relevant illumination area, the illumination of the user 20 is continued and their movement is further tracked. The verification of whether the user 20 has left the relevant illumination area is repeated until it is established in step 220 that the user has left the relevant illumination area. If the user leaves the relevant illumination area, the illumination is switched off in step 230 and the method moves on to step 155, in which the implementation of the remote-controllable parking assistance system is terminated.

In order to design the illumination method executed by the illumination system 11 more advantageously, the following extensions and additional advantages could be integrated into the system. The system can be equipped with a more advanced sensor system, which detects not only the brightness but also the type of ambient light (e.g., direct sunlight, shade, artificial light). This would make it possible to adjust the illumination more precisely in order to improve the visibility and safety of the user 20 in various conditions.

On the basis of the ascertained ambient brightness and specific requirements of the user 20, the control unit 14 of the illumination system 11 can dynamically adjust the intensity of the illumination. This not only allows energy to be saved but also reliably avoids dazzling the user 20 and other road users.

Other than locating the user 20 outside the vehicle 10, the illumination system 11 can also be set up to detect gestures and/or the direction of movement of the user 20. This would make it possible to control the illumination more precisely, by guiding the illumination of the ground in a forward-looking manner in the direction of movement of the user 20, for example. Additionally, control of the parking maneuver and/or of the illumination using gestures and/or body movements would be made possible.

The illumination system 11 could send feedback and instructions to the user 20 via an app or a portable device in real time. Thus, the user 20 could be informed about the status of the parking maneuver or obtain notifications if they should position themself differently for the system to function optimally.

On the basis of the exemplary embodiments, an illumination method, and an illumination system 11 for illuminating a user 20 during a remote-controlled parking maneuver at night or in low-light situations are carried out. The illumination method and the illumination system 11 are able to locate the user 20 and monitor/track their movement around the vehicle by using the external sensor system of the vehicle 10, e.g., cameras 12. The user 20 can be illuminated using the external illumination of the vehicle 10, in order to project symbols onto the road surface around or beside the user 20, to project warning symbols 22 in the direction of the detected or potentially appearing traffic and/or to illuminate the body of the user 20 (except for the head, so as not to dazzle the user). The illumination of the user 20 is preferably maintained for as long as the remote-controlled parking maneuver is carried out, including a defined overrun. If the remote-controlled parking maneuver is completed or canceled, the illumination system 11 continues to monitor the location of the user 20 and maintains the illumination until the user 20 has left the relevant illumination area. During a pause in the remote-controlled parking maneuver, the illumination is maintained until the remote-controlled parking maneuver is either continued or canceled.

In addition to illuminating the user 20 themself, the illumination method, and the illumination system 11 can also illuminate fellow travelers, pets (e.g., dogs) or even laid-down luggage, which could represent an obstacle for other road users. For this purpose, the illumination method or the illumination system 11 can be designed in such a way that it can locate a plurality of persons and/or articles and track their movements and simultaneously illuminate the persons and/or articles.

Figures 5, 6:
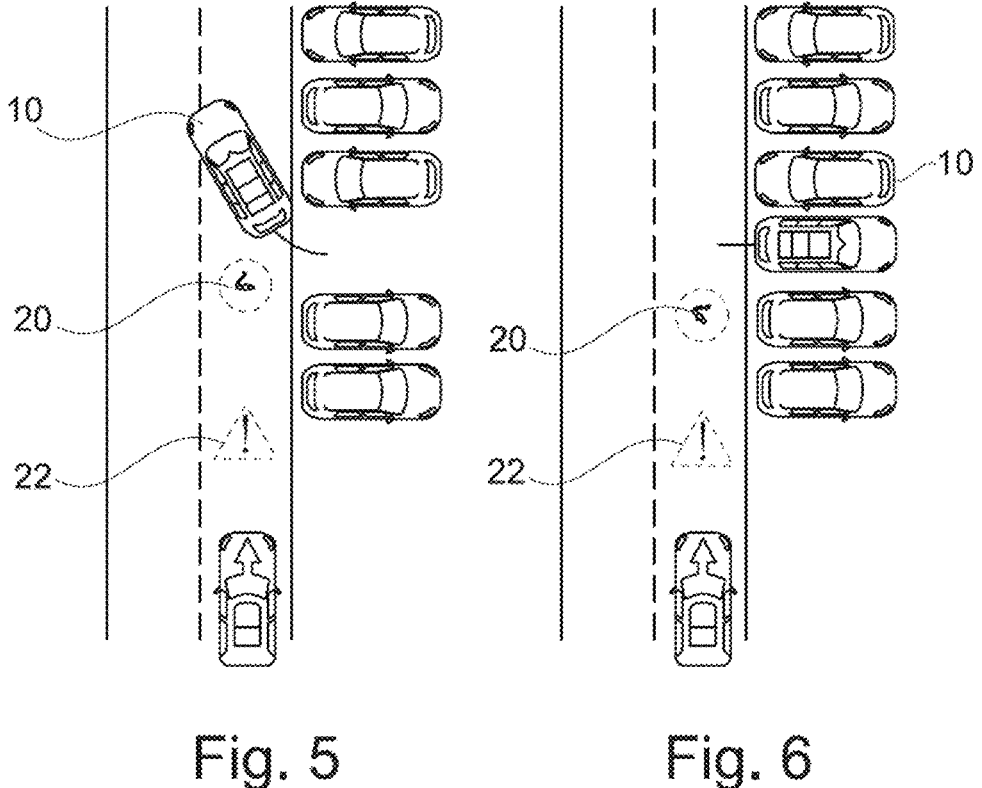
FIG. 5 shows a plan view of a remote-controlled maneuver to enter a parking space.
FIG. 6 shows a plan view of a remote-controlled maneuver to exit a parking space.

FIG. 5 shows a plan view of a maneuver to enter a parking space, which is carried out by means of a remote-controllable parking assistance system which has an illumination system 11 for executing the illumination method according to the invention, and FIG. 6 shows a plan view of a maneuver to exit a parking space which is carried out by means of the remote-controllable parking assistance system which has an illumination system 11 for executing the illumination method according to the invention. Both figures show lighting of the road surface around the user 20, brought about by the illumination system 11, in the form of dashed circles. The illumination method offers the user 20 a safety advantage if they use the remote-controllable parking assistance system in low-light situations, in particular if they stand on the road to remotely maneuver the vehicle 10 into or out of a parking space. Moreover, it also offers a safety advantage for others involved, since the user 20 and any accompanying persons, pets or laid-down luggage can be detected more easily during the remote-controlled parking maneuver.

In order to provide the illumination for the user 20, the external illumination of the vehicle 10, for example, which can comprise the vehicle headlights 19 and peripheral illumination 15 for example, can also be used. The illumination system 11 can be set up to project symbols onto the road. For example, warning signs 22 can be projected onto the road in the direction of the perceived or possibly appearing traffic, which indicate the user 20 of the remote-controllable parking assistance system. The external illumination of the vehicle 10 can also be used to illuminate the body of the user 20 except for the head. If the external illumination of the vehicle 10 is to be used, it is advantageous if the vehicle 10 has a multiplicity of lighting means for peripheral illumination, for example, and/or a number of lighting means which allow the direction of the emitted light to be varied.

The described use of the external illumination of the vehicle 10 offers a plurality of advantages which improve both safety and interaction in road traffic. One advantage is increased visibility. That is to say, by projecting symbols onto the road surface around or beside the user 20, and illuminating the body of the user 20, their visibility is significantly increased for other road users. This can be very important in poor light conditions or at night.

The possibility of projecting warning symbols 22 directly in the direction of the detected or potentially appearing traffic makes it possible for hazards to be communicated immediately and clearly. This can contribute to the avoidance of accidents by enabling other road users to react in time.

LIST OF REFERENCE SIGNS

10 vehicle
11 illumination system
12 camera
13 sensor
14 control unit
15 communication unit
16 smartphone
17 peripheral illumination
18 vest
19 vehicle headlight
20 user
22 warning symbol
110 activation of the remote-controllable parking assistance system by the user
120 ascertaining of ambient light conditions
130 verification of whether the ambient brightness is below a stipulated threshold value
140 execution of the parking maneuver
150 verification of whether the parking maneuver has been completed or canceled
155 termination of the implementation of the remote-controllable parking assistance system
160 locating of the user
170 has user been located outside the vehicle?
180 illumination of the ground surface around the user
190 execution of the parking maneuver
200 verification of whether the parking maneuver has been completed or canceled
210 continuation of the illumination of the user
220 verification of whether the user has left the relevant illumination area
230 switching-off of the illumination

What is claimed is:

1. A method of providing illumination during a remote-controlled parking maneuver of a vehicle, comprising the steps of:

detecting initiation of a remote-controlled parking maneuver for the vehicle by a user;

sensing an ambient light brightness;

comparing the sensed ambient light brightness to a threshold;

if the sensed ambient light brightness is less than the threshold, then activating an illumination device during a remote-controlled parking maneuver to perform at least one of (i) illuminating a ground surface around the user, (ii) illuminating the user themself, and (iii) projecting a warning symbol onto the ground surface to draw attention to the user; and wherein the illumination device is integrated into a mobile device carried by the user.

2. The method of claim 1, wherein the illumination device is worn on a body of the user.

3. The method of claim 1 further comprising the steps of:

locating the user using an external sensor system of the vehicle; and monitoring further movement of the user around the vehicle using the external sensor system;

wherein the activated illumination device illuminates the ground surface around the user, illuminates the user themselves, or projects the warning symbol according to a located position of the user.

4. The method of claim 3, wherein the external sensor system is comprised of at least one camera.

5. The method of claim 1, wherein the ground surface is a road, and wherein the warning symbol is projected onto the road around or beside the user.

6. The method of claim 1, wherein the ground surface is a road, and wherein the warning symbol is projected in a direction of detected or potentially appearing road users.

7. The method of claim 1, wherein the user is illuminated except for a head of the user.

8. The method of claim 1 further comprising the steps of:

locating fellow travelers, accompanying pets, or articles laid down by the user; and illuminating the fellow travelers, accompanying pets, or articles laid down by the user.

9. The method of claim 1, wherein a smartphone of the user is used to illuminate the ground surface around the user.

10. The method of claim 1, wherein the illumination is maintained after completion and/or cancellation of the remote-controlled parking maneuver, until at least one of the following conditions is met:

(a) the user has reached a safe area, (b) the user has entered the vehicle, (c) the user has exceeded a predetermined distance from the vehicle; and (d) the user can no longer be located.

11. An illumination system for producing illumination during a remote-controlled parking maneuver for a vehicle, comprising:

an illumination device;

a sensor configured to sense an ambient light brightness;

a controller configured for (A) detecting an initiation of a remote-controlled parking maneuver by a user, (B) comparing the sensed ambient light brightness to a threshold and, (C) if the initiation of a remote-controlled parking maneuver for the vehicle is detected and the sensed ambient light brightness is less than the threshold, then activating the illumination device in order to perform at least one of (i) illuminating a ground surface around the user, (ii) illuminating the user themself, and (iii) projecting a warning symbol onto the ground surface to draw attention to the user;

an external sensor system of the vehicle for locating the user;

wherein the controller is further configured for monitoring further movement of the user around the vehicle using the external sensor system; and wherein the activated illumination device illuminates the ground surface around the user, illuminates the user themselves, or projects the warning symbol according to a located position of the user.

12. The illumination system of claim 11, wherein the external sensor system is comprised of at least one camera.

13. The illumination system of claim 11, wherein the ground surface is a road, and wherein the warning symbol is projected onto the road around or beside the user.

14. The illumination system of claim 11, wherein the ground surface is a road, and wherein the warning symbol is projected in a direction of detected or potentially appearing road users.

15. The illumination system of claim 11, wherein a smartphone of the user is used to illuminate the ground surface around the user.

16. The illumination system of claim 11, wherein the illumination is maintained after completion and/or cancellation of the remote-controlled parking maneuver, until the controller determines at least one of the following conditions is met:

(a) the user has reached a safe area, (b) the user has entered the vehicle, (c) the user has exceeded a predetermined distance from the vehicle; and (d) the user can no longer be located.

17. The illumination system of claim 11, wherein the illumination device is integrated into the vehicle.

18. A method of providing illumination during a remote-controlled parking maneuver of a vehicle, comprising the steps of:

detecting initiation of a remote-controlled parking maneuver for the vehicle by a user;

sensing an ambient light brightness;

comparing the sensed ambient light brightness to a threshold;

if the sensed ambient light brightness is less than the threshold, then activating an illumination device during a remote-controlled parking maneuver to perform at least one of (i) illuminating a ground surface around the user, (ii) illuminating the user themself, and (iii) projecting a warning symbol onto the ground surface to draw attention to the user; and wherein the illumination device is worn on a body of the user.

19. The method of claim 18 further comprising the steps of:

locating fellow travelers, accompanying pets, or articles laid down by the user; and illuminating the fellow travelers, accompanying pets, or articles laid down by the user.

20. The method of claim 18, wherein the illumination is maintained after completion and/or cancellation of the remote-controlled parking maneuver, until at least one of the following conditions is met:

(a) the user has reached a safe area, (b) the user has entered the vehicle, (c) the user has exceeded a predetermined distance from the vehicle; and (d) the user can no longer be located.

* * * * *